United States Patent [19]
Jones

[11] Patent Number: 6,131,830
[45] Date of Patent: Oct. 17, 2000

[54] BARK DUST UNLOADING SYSTEM

[76] Inventor: Dudley W. Jones, 22601 NW. Dairy Creek Rd., North Plains, Oreg. 97113

[21] Appl. No.: 09/438,472

[22] Filed: Nov. 11, 1999

[51] Int. Cl.$^7$ .................................................. A01C 15/04
[52] U.S. Cl. ........................... 239/654; 239/676; 239/678
[58] Field of Search .................................. 239/654, 676, 239/678, 675, 680

[56] References Cited

U.S. PATENT DOCUMENTS

| | | | |
|---|---|---|---|
| 3,677,540 | 7/1972 | Weiss ....................................... | 239/678 |
| 4,531,680 | 7/1985 | Groeneweg .............................. | 239/678 |
| 4,852,809 | 8/1989 | Davis et al. ............................. | 239/654 |
| 5,533,677 | 7/1996 | McCaffrey ............................... | 239/677 |
| 5,556,237 | 9/1996 | Rexius . | |
| 5,671,891 | 9/1997 | Keenan et al. .......................... | 239/676 |
| 5,725,160 | 3/1998 | Harper et al. ........................... | 239/654 |
| 5,931,393 | 8/1999 | Alsip et al. .............................. | 239/654 |

*Primary Examiner*—Andres Kashnikow
*Assistant Examiner*—Dinh Q. Nguyen
*Attorney, Agent, or Firm*—Robert L. Harrington

[57] ABSTRACT

A bark dust unloading system has a movable wall for moving material in a container to an opening at the rear of the container. An auger assembly in combination with rotating rake assemblies move the material from the sides of the container to the opening. A blower assembly provides an air stream to transport the material deposited in the opening through a hose. The hose is used to distribute the material. An automatic control controls the operation of the unloading system including the movement of the wall, the blower system, the augers and rake assemblies. A remote control allows the operator to alter the operations while directing placement of the bark dust. This provides for operation by a single operator.

4 Claims, 2 Drawing Sheets

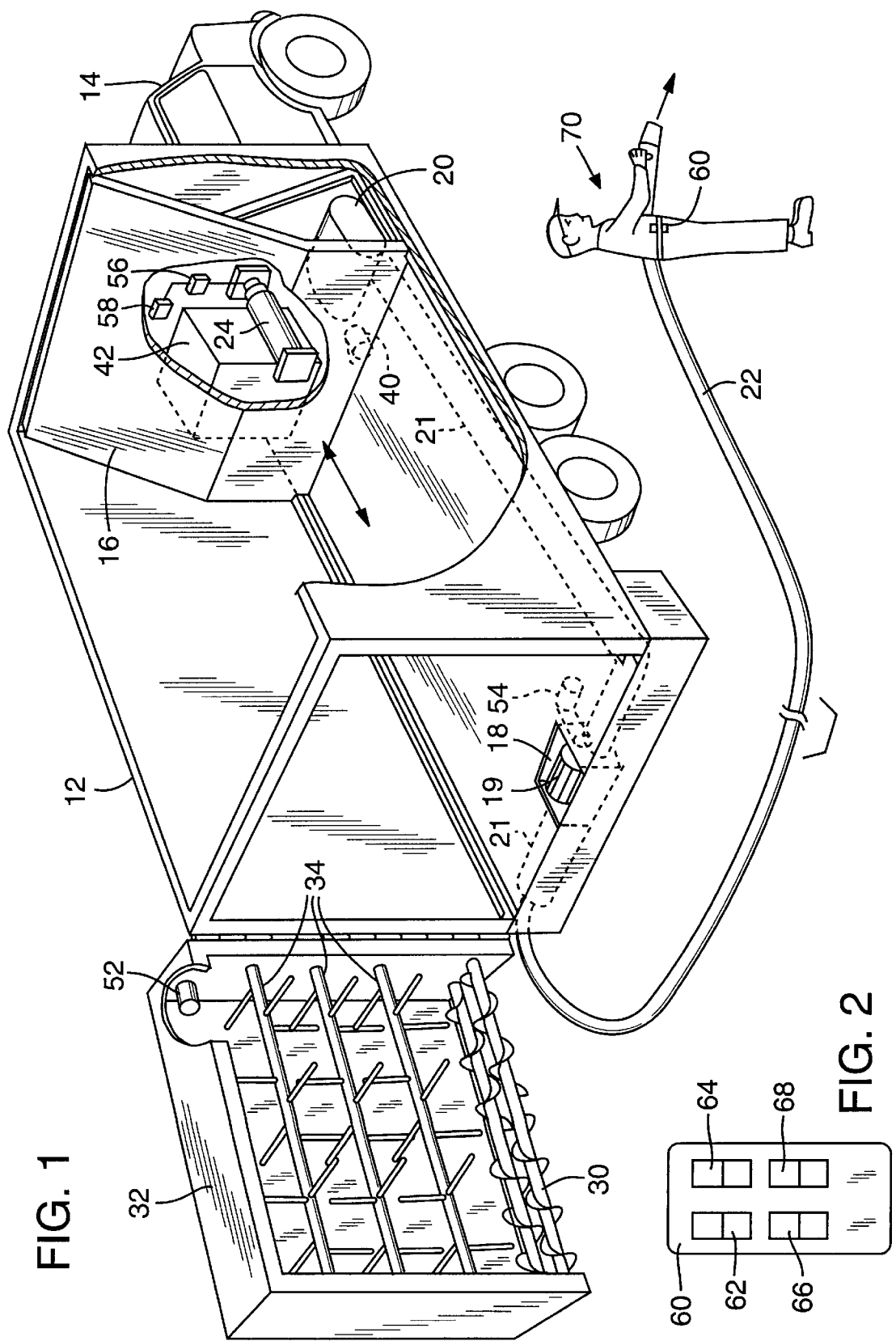

BARK DUST UNLOADING SYSTEM

FIELD OF THE INVENTION

This invention relates to the unloading and distribution of material, e.g., used as ground cover and including bark chips, mulch and the like, from a container, e.g., a truck box, from which the material is fed to a blower which projects the material through a hose, the distal end of which is manipulated to controllably direct the material over a ground cover area.

BACKGROUND OF THE INVENTION

The use of bark dust and chips, mulch and other material as ground cover is common and is hereafter sometimes collectively referred to as bark dust or chips. Such materials are purchased by the truck load and spread under trees, around bushes and so on. A method of distribution has been developed wherein a blower system is installed on the back of a bark hauling truck. A feeder bin at the back end overlies a blower tube to which a flexible hose is attached. The bark dust/chips are pushed into the feeder bin and then fed into the air stream of the tube and into and through the hose. An operator directs the distal end of the hose for depositing the material into the desired area. The hose is sufficiently long to enable such distribution of the bark dust/chips substantial distances from the truck, e.g., into a back yard of a residence with the truck sitting in a driveway at the front of the house.

In the prior art, it takes two operators to handle this process. One operator, of course, needs to manipulate the discharging end of the hose. The other operator needs to oversee the process of depositing the bark chips into the feeder bin at the end of the truck. A moving front wall is used to push the material toward the back of the truck box/container but operation of the wall needs to be monitored and controlled as well as monitoring of the material flow into and through the feeder bin, e.g., to unplug the feeder bin inlet should clumps of the material bridge over the inlet and close off flow into the feeder bin.

BRIEF DESCRIPTION OF THE INVENTION

It is an object of the present invention to obviate the need for the second operator (monitoring flow of the material into the feeder bin). To accomplish this objective, the process of feeding material into the feeder bin needs to be automatic and should anticipate and correct the common problems of feeding too fast or too slow and bridging of the materials across the feeder bin inlet.

In the preferred embodiment, the bridging problem is satisfied by enlarging the opening into the feeder bin and providing a double screw or auger inlet feed for directing flow into the feeder bin. The double screws or auger provide the function of moving material from the sides of the box to the opening into the feeder bin and they cooperatively break up and force material through the system that heretofore caused bridging. This feature will be more clearly understood upon reference to the detailed description.

Controlled feeding is achieved by automating the movement of the front wall in response to a detection mechanism. In the preferred embodiment, the detection mechanism is a pressure sensing device that senses resistance to wall movement. Through trial and error as concerns the different materials being distributed, it is known what pressures are too low so as to require the pushing movement to commence and what pressures are too high so as to require the pushing movement to stop for optimum feeding of material into and through the feeder bin. These pressures are entered into a control that starts and stops wall movement accordingly.

The sole operator also has adjustability capabilities so that if he is experiencing too fast or too slow feeding, he can adjust the pressure settings. There are many variations of such controls even as relates to a pressure control as briefly described. Again, such will become apparent upon reference to the following detailed description and drawings referred to therein.

BRIEF DESCRIPTION OF THE DRAWINGS

FIG. 1 is a view of a bark unloading system of the present invention;

FIG. 2 is a view of a remote control for controlling the bark distribution system of FIG. 1.

DESCRIPTION OF THE PREFERRED EMBODIMENT

Figure 3:
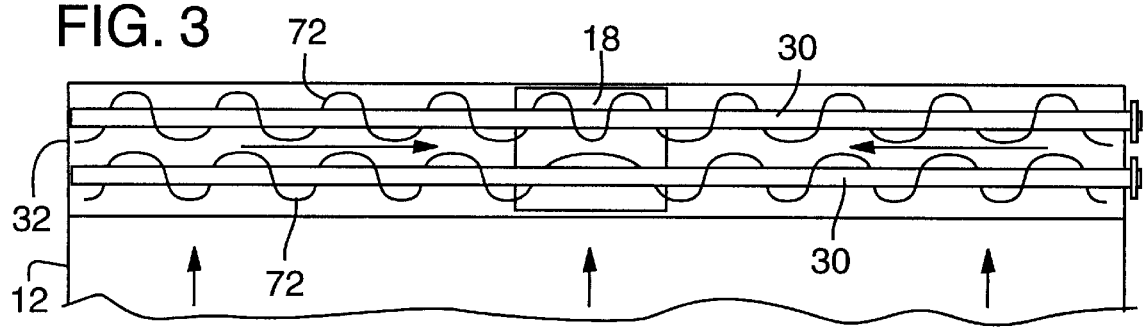
FIGS. 3–5 are schematic views illustrating the movement of materials through the system of FIG. 1.

FIG. 1 illustrates a bark dust unloading system of the present invention. The system includes a mobile container 12 and in this embodiment the container 12 is a box mounted to the chassis of a vehicle such as a truck 14. The container 12 includes a distribution system that will unload and distribute material such as bark dust that is contained within the container 12. Basically a movable wall 16 is provided to move the material toward an open feeder bin 18. A known rotating baffle gate 19 is provided in the feeder bin 18 and moves the material through the feeder bin. The feeder bin 18 is coupled to an air conduit 21 which directs air flow from a blower system 20. The air flow transports the material received from the feeder bin 18 outwardly through a hose 22. The movable wall 16 is movable in the container 12 toward and away from the feeder bin 18 by a cylinder 24. An auger assembly 30 (double screw-type augers) is mounted on the rear door (end gate 32). The auger assembly 30 is arranged to move the material from the sides of the container 12 toward the open feeder bin 18. Mounted above the auger assembly 30 on the end gate 32 are multiple rotatable rake assemblies 34. The rake assemblies 34 loosens and directs the bark dust downwardly toward the auger assembly as the movable wall 16 moves the material into the rake assemblies.

Motive power is provided to the components of the container 12 by a hydraulic pump 40 that is coupled to the transmission of the vehicle 14. A hydraulic reservoir 42 is mounted at the forward end of the container 12 behind the movable wall 16. The blower assembly 20 and the hydraulic cylinder 24 are also mounted in the forward portion of the container 12.

A drive motor 52 drives the augers 30 and the rake assemblies 34. The rotating baffle 19 of the feeder bin 18 is rotatably driven by a drive motor 54.

A pressure sensing device 56 is coupled to the cylinder 24. The pressure sensing device 56 is adjustable by a control 58. The pressure applied against the wall 16 may thus be adjusted by the control 58 to vary the pressure applied against the wall 16. The different materials received in the container will vary in their resistance to such movement and will require different pressure settings to properly direct the movement of the wall 16 and thus the rate at which material is delivered to the feeder bin 18.

A remote control 60 is also provided to control the operation of the bark dust unloading system. The remote control 60 has a switch 62 for controlling the speed of the blower to thus control the flow of the air through the open feeder bin 18 and the hose 22. Another switch 64 is provided to control the rotational speed of the rotating baffle 19 of the feeder bin 18. A switch 66 is provided as a pause and resume control that pauses the entire system. Switch 68 is an auxiliary switch in the control 60 and could, for example, be provided to operate the pressure control unit 58 to vary the pressure applied to the wall 16.

Figure 4:
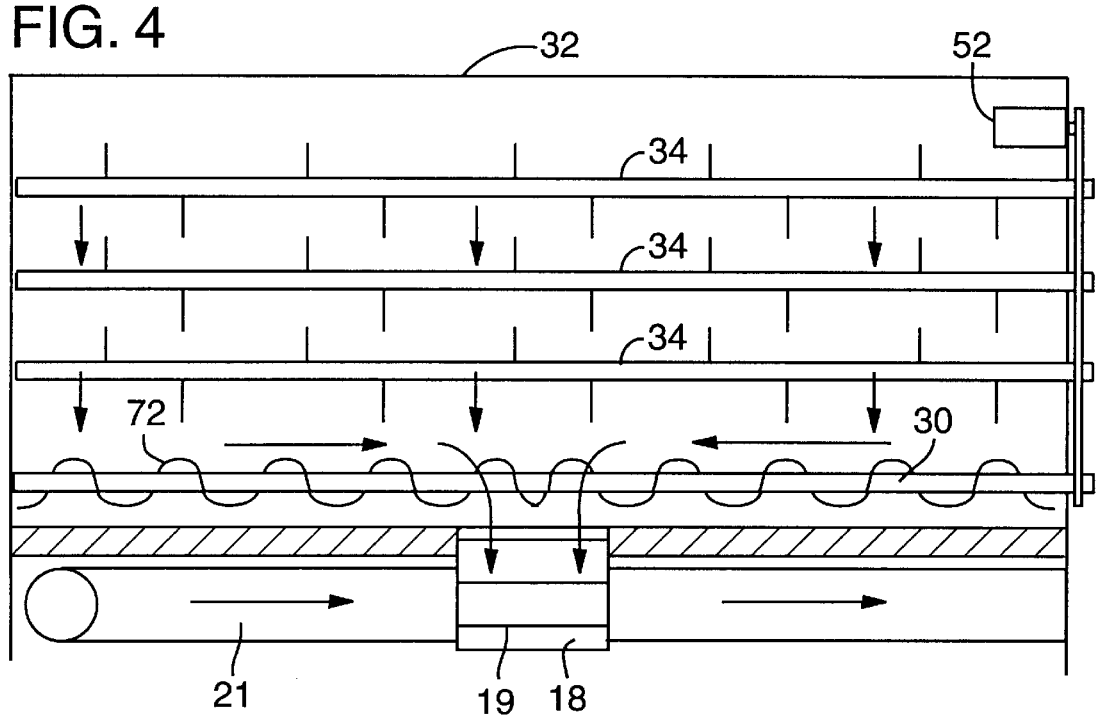
Figure 5:
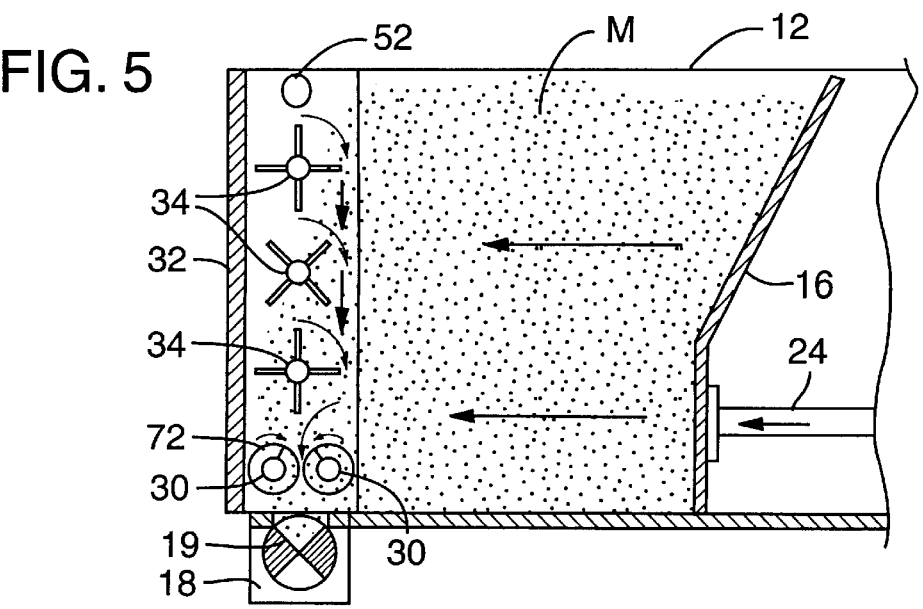

Refer to FIGS. 3, 4 and 5 which schematically illustrate the feeding of bark dust and chips, and the like, into the feeder bin 18. As this material is pushed toward the open end of the container 12, the material M is first engaged by the rotating fingers or tines of the rake assemblies 34 which loosens the material from a somewhat compressed condition and directs the loosened material downward toward the augers 30 (FIGS. 4 and 5). The augers 30 are of the screw type with the flutes 72 being oppositely directed (one side versus the other side—See FIG. 4) and the pair of augers 30 being oppositely and inwardly directed (the inner auger versus the outer auger—see FIG. 3). Thus, material that is deposited onto the augers is directed from the sides toward the center and then downwardly into the feeder bin. This material flow is illustrated by arrows. Material that is not broken down into sufficiently small pieces will be crushed between the augers and the likelihood of bridging across the feeder bin opening is substantially reduced if not eliminated.

The arrangement of bark dust unloading system 10 permits a single operator to unload and distribute the material received in the container 12. The operator connects the hose 22 to the air conduit 21. The hydraulic pump 40 is engaged and is rotatably driven by the transmission of the vehicle 14. The control 58 is typically preset to accommodate the particular material being delivered. The rate of the blower assembly 20 is also controlled to control the rate of air flow through the air conduit 21, the feeder bin 18 and the hose 22.

In operation, the material is dislodged by the rake assemblies 34 and then fed by the augers 30 into the feeder bin 18 and out the hose 22. As the material is thus dispensed, the resistance to wall movement is reduced and the wall 16 will then move toward the end gate 32. When sufficient pressure is again built up, i.e., resistance to movement, the wall will stop to allow the feeding process to catch up.

The operator may vary the pressure applied against the wall 16 to control the rate of movement of the wall 16 which controls the rate of material being dispensed through the opening 18. However, the preset controls automatically apply the preset pressure considered to be desirable for the material being dispensed and the operator may not have to make any alterations or minimal alterations. If desired, the operator may also start or stop the movement of the wall 16 at any time. The operation is thus capable of automatic operation but with the operator having full control of the dispensing procedure.

Those skilled in the art will recognize that modifications and variations may be made without departing from the true spirit and scope of the invention. The invention is therefore not to be limited to the embodiments described and illustrated but is to be determined from the appended claims.

The invention claimed is:

1. A ground cover distribution system comprising:

a mobile container;

a distribution mechanism positioned at an end of said mobile container;

a movable wall within the container for moving the material contained in the container toward said distribution mechanism and thereby accessible to the distribution mechanism;

said distribution mechanism including an opening in the container and a hose in communication with said opening for receiving material and a conveyor mechanism interposed between the opening and the hose that conveys material received from the container and directed through said opening into and through the hose to be deposited as ground cover; and an automatic control controlling the movement of the movable wall, said control having detection capability detecting the presence of material accessible for deposit into the opening and responding thereto for alternately starting and stopping the movement of the wall.

2. A ground cover distribution system as defined in claim 1 wherein the distribution mechanism includes a double auger assembly for directing material from the sides of the container to the opening, and further for cooperatively reducing and feeding the material into the opening between the augers.

3. A ground cover distribution system as defined in claim 1 wherein the detection capability is provided by a pressure sensor that detects the resistance of the wall to being moved, and high and low pressure settings thereof to determine the stop and start operation of the wall movement.

4. A ground cover distribution system as defined in claim 1 including a remote control coupled to said automatic control to modify the settings and provide operator control of the movable wall.

\* \* \* \* \*